April 20, 1954 W. W. JOHNSTONE 2,676,192
PREPARATION OF ALKYL PHENOLS FROM GASOLINE
Filed Jan. 31, 1951
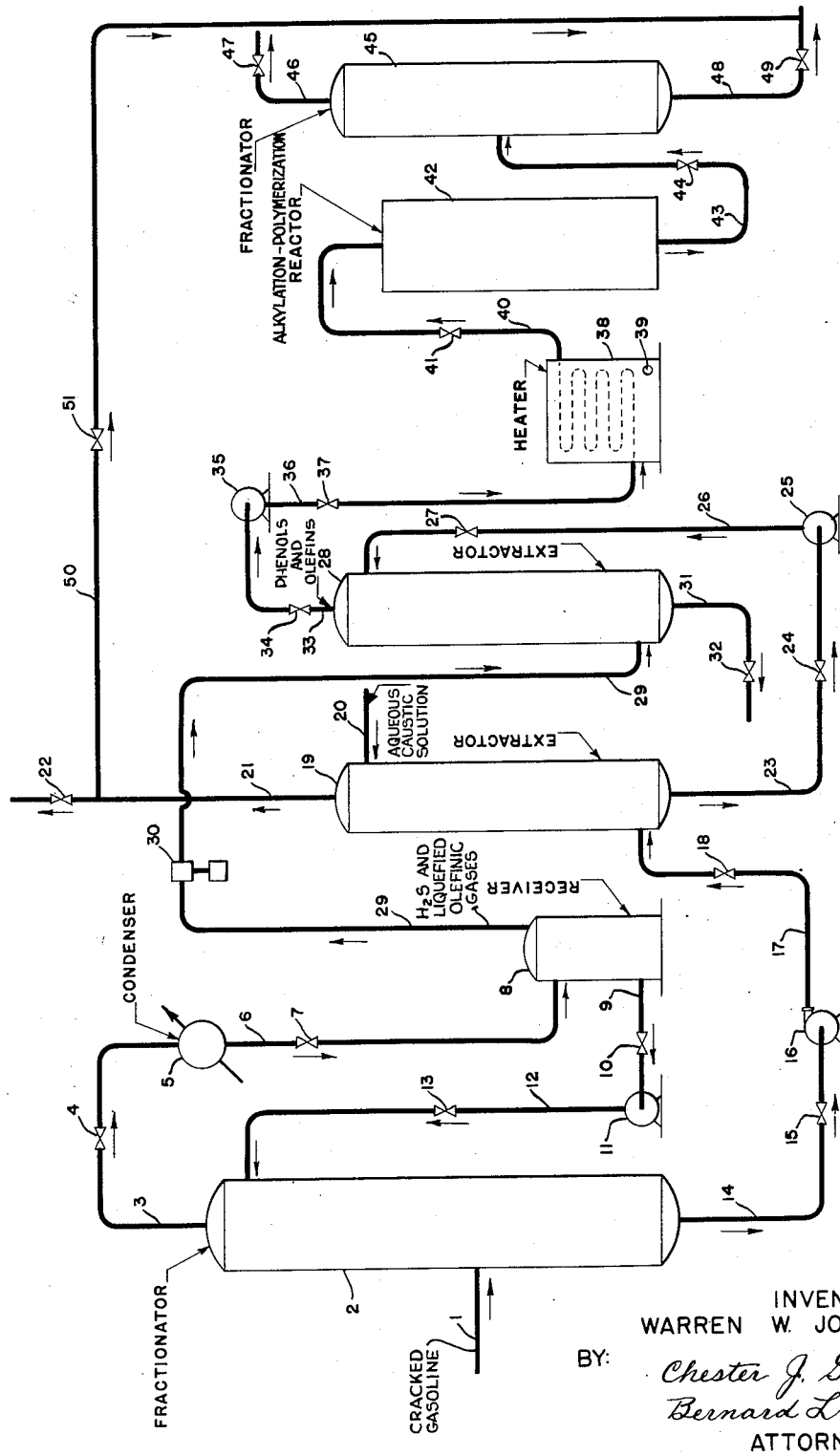
INVENTOR:
WARREN W. JOHNSTONE
BY: Chester J. Giuliani
Bernard L. Kramer
ATTORNEYS:

Patented Apr. 20, 1954

2,676,192

UNITED STATES PATENT OFFICE 2,676,192

PREPARATION OF ALKYL PHENOLS FROM GASOLINE

Warren W. Johnstone, Riverside, Ill., assignor to Universal Oil Products Company, Chicago, Ill., a corporation of Delaware Application January 31, 1951, Serial No. 208,730

6 Claims. (Cl. 260—624)

This invention relates to the treatment of hydrocarbons and more particularly to a combination process wherein, by means of a series of mutually related and interdependent steps, phenols are liberated from a used alkaline treating solution and are incorporated into a liquefied gas stream prior to reaction thereof to form polymer. During the latter reaction the phenols are reacted with a portion of the gases to form alkylated phenols. The alkylated phenols possess desirable antioxidant properties and, in this manner, a final gasoline of improved stability is obtained.

In one embodiment the present invention relates to a combination process which comprises treating gasoline containing phenolic compounds with an alkaline reagent to remove the phenols from the gasoline and retain them in the alkaline reagent, treating liquefied hydrocarbon gases containing more highly acidic components with said alkaline reagent containing phenol, whereby said phenol is transferred from the alkaline reagent to the liquefied gases and treating said gases containing phenol to form alkylated phenol and polymer.

From the description of the invention hereinbefore set forth, it is readily apparent that the novel combination process offers numerous advantages. Firstly, it provides for the further utilization of the treating reagent which previously had been employed to remove acidic components including phenols from gasoline and which otherwise would be discarded. Secondly, the invention provides for recovering the valuable phenols from the treating reagent and, thirdly, it provides for converting these phenols into more valuable alkylated phenols along with the polymerization of the hydrocarbon gases to form polymers.

The gasoline treated in the first step of the process preferably is blended with the polymer gasoline, and the blend thereby is stabilized against oxidative deterioration by the inhibiting properties of the alkylated phenols.

The invention is further explained in conjunction with the accompanying diagrammatic flow drawing which illustrates one specific embodiment of the present invention.

Referring to the drawing, the gasoline charge is introduced to the process through line 1 and is supplied to fractionator 2. Any suitable gasoline containing phenolic compounds may be utilized as the charge to the process and generally will comprise cracked gasoline containing sulfur compounds, such as mercaptans, hydrogen sulfide, etc. as well as phenols. It is understood that reference to phenols herein includes phenolic compounds which may contain alkyl substituents thereof such as cresols, xylenols, etc. However, in accordance with the present invention, the phenolic compounds are alkylated in a later step of the process to form alkylated phenols which possess inhibiting properties and therefore will stop or retard gum formation in the gasoline.

In the case here illustrated, fractionator 2 preferably comprises a stabilizer whereby normally gaseous products, including hydrogen sulfide, ethylene, ethane, propylene, propane and preferably at least a portion of the butylenes and butanes are separated and removed as an overhead fraction, to leave a gasoline product having the desired vapor pressure. Fractionator 2 normally will be provided with suitable heating means in the lower portion thereof, not illustrated, to effect the desired vaporization of the gaseous components, and also normally will contain contacting means therein, not illustrated, such as bubble decks, trays, side to side pans, etc. in order to obtain efficient fractionation therein.

Normally gaseous products, including gaseous olefins and hydrogen sulfide, are withdrawn from fractionator 2 through line 3 and valve 4 to condenser 5. Condenser 5 may be cooled by any suitable means, including water passed in indirect heat exchange with the hydrocarbons passing through the condenser. The cooled and partly condensed hydrocarbons pass from condenser 5 through line 6 and valve 7 into receiver 8, wherein uncondensed gases separate from the condensate. The condensate may be withdrawn from the receiver through line 9 and valve 10 to pump 11, by means of which at least a portion thereof is recycled by way of line 12 and valve 13 to the upper portion of fractionator 2 to serve as a cooling and refluxing medium therein.

Gasoline is withdrawn from the lower portion of fractionator 2 through line 14 and is directed through valve 15 to pump 16, by means of which it is supplied through line 17 and valve 18 to extractor 19, wherein it passes in countercurrent contact to caustic solution introduced through line 20. The drawing illustrates a continuous flow process. However, it is understood that a batch type operation may be employed. During contact with the caustic solution in extractor 19, acidic components, including mercaptans, phenols, etc. are removed from the gasoline and are retained in the caustic solution. The gasoline now substantially reduced in acidic components is withdrawn from extractor 19 through line 21 and may be removed from the process through valve 22. In a preferred embodiment of the invention, at least a portion of the treated gasoline is blended with the polymer gasoline in the manner to be hereinafter set forth.

Caustic is the preferred treating reagent and the caustic preferably is utilized as an aqueous solution of from about 5° to about 50° Baumé gravity and still more preferably of from 10° to about 30° Baumé gravity. It is understood that any other suitable alkaline treating agent may be employed including potassium hydroxide, as well as solutions containing solutizers including methanol, ethanol, propanol, acetone, ethylene glycol, glycol ethers, isobutyric acid, etc. The extraction is generally effected at atmospheric temperatures although temperatures up to about 200° F. may be employed when desired. In a preferred embodiment, the extraction is effected at superatmospheric pressure.

The caustic containing phenols is withdrawn from the lower portion of extractor 19 through line 23 and valve 24 to pump 25, by means of which it is directed through line 26 and valve 27 to the upper portion of extractor 28. In the case here illustrated, the gaseous hydrocarbons remaining uncondensed in receiver 8 are withdrawn therefrom through line 29 and are directed to compressor 30 and the liquefied gases are then introduced into the lower portion of extractor 28, wherein the liquefied gases pass in countercurrent contact with the caustic solution introduced through line 26. Here again, while a continuous flow is illustrated in the drawing, it is understood that a batch type operation may be employed. In another embodiment, receiver 8 may be operated at a superatmospheric pressure high enough to retain the normally gaseous hydrocarbons in liquid phase and above the pressure employed in extractor 28. This embodiment will avoid the requirement for compressor 30.

The liquefied gases introduced through line 29 to extractor 28 will contain hydrogen sulfide and low boiling mercaptans including methyl mercaptan. During contact with the caustic solution containing phenols in extractor 28, the hydrogen sulfide and methyl mercaptan, being more acidic than phenols, will liberate the phenols from the caustic solution and, in turn, will be retained in the caustic solution. Thus, this step provides the dual function of removing hydrogen sulfide and light mercaptans from the gases and also to transfer the phenols from the caustic solution to the liquefied gases.

In order to retain the phenols in the normally gaseous hydrocarbons, it is an essential feature of the present invention that extractor 28 is operated under sufficient superatmospheric pressure to maintain the normally gaseous hydrocarbons in liquid phase, which pressure may range from about 100 pounds to 500 pounds or more per square inch. The temperature employed preferably is from about 50° to about 150° F. and still more preferably from about 80° to about 120° F. Caustic solution containing sulfur compounds is withdrawn from extractor 28 through line 31 and may be discarded from the process through valve 32. When desired, the caustic solution may be subjected to further treatment in order to remove the sulfur components therefrom and to regenerate the caustic for further use in the process.

The gases containing phenols are withdrawn from extractor 28 through line 33 and valve 34 to pump 35, whereby they are directed through line 36 and valve 37 to heater 38 provided with suitable heater means indicated at 39. In the case here illustrated, the gases are heated to a temperature of from about 300° to about 600° F., at a pressure of from about 100 to 1000 pounds or more, and are directed through line 40 and valve 41 to reactor 42. Reactor 42 may contain any suitable polymerization catalyst, a particularly preferred catalyst comprising an association of phosphoric acid and diatomaceous earth and generally referred to as solid phosphoric acid. In reactor 42, the olefinic gases will be in part polymerized to form polymers boiling within the range of gasoline and in part reacted with the phenols to form alkylated phenols. It is understood that any suitable polymerization catalyst which also will effect alkylation of the phenols may be employed, including copper pyrophosphate, aluminum halides, as well as liquid acids such as sulfuric acid, phosphoric acid, hydrofluoric acid, etc. It is understood that when catalysts other than the solid phosphoric acid is employed, the operating conditions as well as the plant equipment will be modified accordingly.

The reaction products are withdrawn from zone 42 through line 43 and are directed through valve 44 into fractionator 45. Fractionator 45 similarly will contain heating means at the bottom and cooling means at the top, as well as contacting means therein such as bubble decks, trays, side to side pans, etc. Gases unconverted in reactor 42 are separated from polymer and alkylated phenols in fractionator 45 and are withdrawn therefrom through line 46 and valve 47. The polymer gasoline containing alkylated phenols is withdrawn from fractionator 45 through line 48 and valve 49. When desired, the polymers may be subjected to further fractionation to remove the high boiling polymers boiling above the range of gasoline. In a preferred embodiment of the invention, at least a portion of the caustic washed gasoline is directed from line 21 through line 50 and valve 51, to be blended with the polymer gasoline, either before or after further fractionation of the latter to remove high boiling components.

It is understood that numerous modifications may be made within the scope of the present invention. For example, fractionator 2 may be operated to remove substantially all of the gases from the gasoline, and fractionator 45 may be operated as a stabilizer to produce a final gasoline blend of desired vapor pressure. In this embodiment gasoline in line 50 may be supplied to fractionator 45 by any suitable means, not illustrated. It is understood that other gas fractions containing olefins, hydrogen sulfide and/or light mercaptans, alone or together with the gases from receiver 8, may be supplied to extractor 28.

The following example is introduced to illustrate further the novelty and utility of the present invention but not with the intention of unduly limiting the same.

*Example*

A Midcontinent thermally cracked gasoline may contain 0.035% by weight of mercaptans, 0.03% by weight of phenols, and 500 grains of hydrogen sulfide per 100 cubic feet. The cracked gasoline is introduced into fractionator 2, which is operated as a stabilizer to remove overhead the light gases, including hydrogen sulfide and a sufficient portion of the butanes and butylene, to leave a gasoline of the desired vapor pressure. The stabilizer is operated at a pressure of about 250 pounds per square inch. The stabilized gasoline is treated in extractor 19 with an aqueous caustic solution of about 25° Baumé gravity at a temperature of about 85° F. and a pressure of about 25 pounds per square inch. The caustic solution from this extractor is supplied directly, without intermediate regeneration, to extractor 28 wherein it is utilized to treat the gases previously separated in receiver 8. Extractor 28 is operated at a temperature of about 85° F. and at a pressure of about 175 pounds per square inch. The hydrogen sulfide contained in the gases from receiver 8 will displace the phenols absorbed from the gasoline in extractor 19. The gases in liquid phase containing phenols are heated in heater 38 to about 450° F. and are subjected to reaction in zone 42 at a pressure of about 700 pounds per square inch. The effluent products are fractionated in zone 45 to remove unconverted gases and to separate polymer containing alkylated phenols.

The previously caustic washed gasoline is directed through line 50 and is blended in line 48 with the polymer gasoline containing alkylated phenols.

I claim as my invention:

1. A combination process which comprises treating gasoline containing phenolic compounds with an alkali metal hydroxide solution to remove the phenols from the gasoline and retaining the phenols in said solution, treating hydrocarbon gases containing more highly acidic components and olefins under sufficient pressure to maintain said gases in liquid phase, with said solution prior to the removal of phenols from the latter, whereby said phenols are transferred from the solution to the gases, and subjecting said gases containing phenol and olefins to reaction to form alkylated phenols and polymer.

2. A combination process which comprises treating gasoline containing phenols with an alkali metal hydroxide solution to remove the phenols from the gasoline and retaining the phenols in said solution, treating hydrocarbon gases containing hydrogen sulfide and olefins under sufficient pressure to maintain said gases in liquid phase, with said solution prior to the removal of phenols from the latter, whereby said phenols are transferred from the solution to the gases, and subjecting said gases containing phenol to form alkylated phenol and olefins to reaction and polymer.

3. A combination process which comprises treating cracked gasoline containing phenols with an alkali metal hydroxide solution to remove the phenols from the gasoline and retaining the phenols in said solution, treating cracked hydrocarbon gases containing hydrogen sulfide and olefins with said solution prior to the removal of phenols from the latter, under sufficient pressure to maintain said gases in liquid phase, whereby said phenols are transferred from the solution to the gases, and subjecting said gases containing phenols and olefins to reaction in the presence of a polymerization catalyst to form polymer and alkylated phenol.

4. A combination process which comprises treating cracked gasoline containing phenols with a caustic solution to remove the phenols from the gasoline and retaining the phenols in the caustic solution, treating cracked hydrocarbon gases containing hydrogen sulfide and olefins with said caustic solution prior to the removal of phenols from the latter, under sufficinet pressure to maintain said gases in liquid phase, whereby said phenols are transferred from the caustic solution to the liquefied gases, and subjecting said gases containing phenols and olefins to reaction in the presence of a polymerization catalyst to form polymer and alkylated phenols.

5. A combination process which comprises fractionating a mixture of gasoline and gases formed in the cracking of oil heavier than gasoline, separating in said fractionation a normally gaseous fraction containing normally gaseous olefins and hydrogen sulfide and a gasoline fraction containing phenols, subjecting said gasoline fraction to treatment with an aqueous caustic solution under conditions to absorb phenols from said gasoline in said caustic solution, separately treating said normally gaseous fraction with the aqueous caustic solution containing phenols, without intermediate recovery of phenols from said caustic solution, and thereby displacing the phenols in said caustic solution by the hydrogen sulfide in said normally gaseous fraction, said treatment being under sufficient pressure to maintain said normally gaseous hydrocarbons in substantially liquid phase, withdrawing from said last mentioned treatment a normally gaseous fraction containing phenols, subjecting said fraction to reaction in the presence of a phosphoric acid catalyst to polymerize a portion of the normally gaseous olefins and to react another portion of the normally gaseous olefins with said phenols to form alkylated phenols, and recovering a polymer containing alkylated phenols.

6. The process of claim 5 further characterized in that the gasoline after treatment with caustic solution is combined with the polymer containing alkylated phenols to thereby produce a gasoline blend of improved oxidation stability.

References Cited in the file of this patent

UNITED STATES PATENTS

| Number | Name | Date |
|---|---|---|
| 2,174,174 | Greensfelder et al. | Sept. 26, 1939 |
| 2,191,240 | Stevens et al. | Feb. 20, 1940 |